United States Patent
Coispeau

[11] 3,948,878
[45] Apr. 6, 1976

[54] PYRAZOLIUM-AZO-PHENYL COMPOUNDS

[75] Inventor: Gérard Emile Edgard Coispeau, Soisy-sur-Montmorency, France

[73] Assignee: Produits Chimiques Ugine Kuhlmann, Paris, France

[22] Filed: Jan. 27, 1975

[21] Appl. No.: 544,541

Related U.S. Application Data

[63] Continuation-in-part of Ser. No. 334,501, Feb. 21, 1973, abandoned.

[30] Foreign Application Priority Data

Feb. 24, 1972  France .............................. 72.06219
Dec. 28, 1972  France .............................. 72.46600

[52] U.S. Cl. ................ 260/147; 260/162; 260/163; 260/310 R
[51] Int. Cl.² C09B 43/00; C09B 29/08; C09B 29/26
[58] Field of Search ..................... 260/147, 163, 162

[56] References Cited
UNITED STATES PATENTS

| | | | |
|---|---|---|---|
| 3,332,930 | 7/1967 | Mohr et al. | 260/147 X |
| 3,515,715 | 6/1970 | Straley et al. | 260/163 |
| 3,763,140 | 10/1973 | Entschel et al. | 260/163 X |

*Primary Examiner*—Charles F. Warren
*Attorney, Agent, or Firm*—Beveridge, DeGrandi, Kline & Tunsford

[57] ABSTRACT

Dyestuffs of the formula:

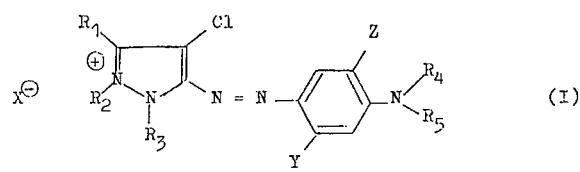

(I)

in which $R_1$ represents a hydrogen atom or an alkyl or aryl group, $R_2$ represents an alkyl group, $R_3$ represents an aryl group when $R_1$ is an alkyl group and an alkyl group when $R_1$ is a hydrogen atom or an aryl group, $R_4$ represents a hydrogen atom or an alkyl group, $R_5$ represents an alkyl, hydroxyalkyl, cyanalkyl, acylaminoalkyl or alkanedioyliminoalkyl group, Y represents a hydrogen atom or an alkyl, alkoxy or acylamino group, Z represents a hydrogen atom or an alkoxy group and X represents a monovalent anion; process for the preparation of such dyestuffs which comprises treating a dyestuff of the formula:

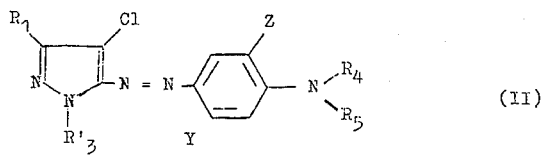

(II)

in which $R_1$, $R_4$, $R_5$, Y and Z have the same significance as above, $R'_3$ represents a hydrogen atom if $R_1$ is a hydrogen atom or an aryl group and $R'_3$ represents an aryl atom if $R_1$ is an alkyl group, with an alkylating agent; and the use of such dyestuffs for the colouration of fibres based on polymers or copolymers of acrylonitrile or fibres based on polyesters or polyamides modified by acid groups.

5 Claims, No Drawings

PYRAZOLIUM-AZO-PHENYL COMPOUNDS

This application is a continuation-in-part of my copending application Ser. No. 334,501 filed on Feb. 21, 1973 now abandoned.

The invention relates to new azo-pyrazolium dyestuffs.

According to the present invention dyestuffs are provided of the general formula:

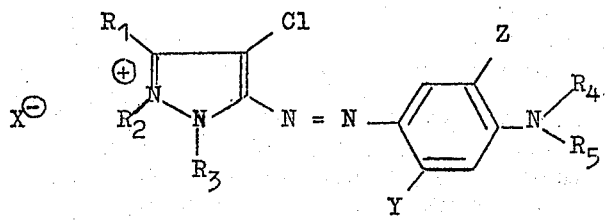

in which $R_1$ represents a hydrogen atom or an alkyl or aryl group, $R_2$ represents an alkyl group, $R_3$ represents an aryl group when $R_1$ is an alkyl group and an alkyl group when $R_1$ is a hydrogen atom or an aryl group, $R_4$ represents a hydrogen atom or an alkyl group, $R_5$ represents an alkyl, hydroxyalkyl, cyanalkyl, acylaminoalkyl or alkanedioyliminoalkyl group, Y represents a hydrogen atom or an alkyl, alkoxy or acylamino group, Z represents a hydrogen atom or an alkoxy group and X represents a monovalent anion.

The alkyl groups represented by $R_2$ and $R_3$ are preferably methyl and ethyl groups. Those of the substituents R1, $R_4$, and $R_5$ are preferably groups containing 1 to 5 carbon atoms, and the alkyl group represented by Y is preferably the methyl group. The alkoxy groups represented by Y and Z are preferably methoxy and ethoxy groups. The acyl residues of the acylaminoalkyl groups represented by $R_5$ or the acylamino groups represented by Y which may be more particularly mentioned are those of the aliphatic carboxylic acids containing 1 to 4 carbon atoms, preferably the acetyl residue, or those of aromatic carboxylic acids such as the benzoyl residue. As aryl groups represented by $R_1$ or $R_3$ may be especially mentioned the phenyl group possibly carrying one or two non-ionic substituents such as halogen atoms and nitro groups, alkyl groups containing 1 to 4 carbon atoms (preferably methyl) and alkoxy groups containing 1 to 4 carbon atoms (preferably methoxy or ethoxy).

The dyestuffs of formula (I) may be prepared for example by treating a dyestuff of the general formula:

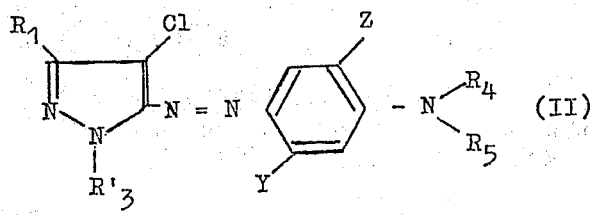

in which $R_1$, $R_4$, $R_5$, Y and Z have the same significance as above, $R'_3$ represents a hydrogen atom if $R_1$ is a hydrogen atom or an aryl group and $R'_3$ represents an aryl group if $R_1$ is an alkyl group, with an alkylating agent.

The alkylation treatment may be carried out for example in an organic solvent, such as a benzene hydrocarbon and a chlorinated derivatives thereof, dimethylformamide or chloroform. The alkyl halides, alkyl arylsulphonates, alkyl sulphates, especially the methyl and ethyl salts are examples of alkylating agents which may be used. It is also possible to operate in an excess of alkylating agent.

The dyestuffs of formula (II) may be prepared for example by coupling a diazo derivative of a 5-aminopyrazole the general formula:

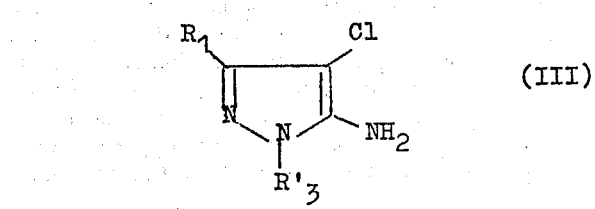

with a substituted aniline of the general formula:

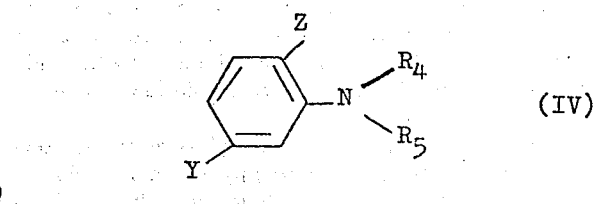

Among the 5-aminopyrazoles there are some, such as the $N_1$-aryl derivatives which have already been described (Liebig's Ann. 339, 142); others, for example the 3-aryl-4-chloro-amino-pyrazoles, are new. They may be prepared for example by the action of chlorine on the corresponding 5-acylamino-pyrazole in solution in a solvent, for example dimethylformamide.

The diazotisation of the aminopyrazoles may, for example, be effected in the presence of acetic or propionic acid or in the presence of concentrated mineral acid. Owing to the presence of the chlorine atom in the 4-position, there is no formation of C-nitroso compound during the diazotisation of these bases (E.- MOHR, J.prakt.chem., 1914, 90, 510 and French Pat. No. 1,439,687). On the other hand, the chlorine atom favours the coupling reaction of the diazonium salts with anilines of the general formula (IV). The reaction is carried out with improved yields with regard to the non-chlorinated homologues. An appreciable bathochromic effect is found in the corresponding cationic dyestuffs and new shades are obtained.

The dyestuffs of formula (I) have certain advantageous inherent properties and provide pure and bright shades on fibres based on polymers and copolymers of acrylonitrile as well as on fibres based on polyesters or polyamides modified by acid groups, these shades have on the whole good fastness, especially to light, to strong washing and to steaming.

The dyestuffs of formula (I) also give consistent shades when polyacrylic fibres of various origins are dyed with them and this is a very important property for the dyer who can rely on uniform shade for batches of fibres used in the dyeing operation.

The colouration is conferred by the dyestuff cation; the anion does not play any tinctorial part. It may be exchanged for another anion, for example, for the purpose of improving the solubility of the dyestuffs.

In the following Examples which are purely illustrative the parts are parts by weight unless the contrary is indicated.

EXAMPLE 1

3.8 parts of 1-phenyl-3-methyl-4-chloro-5-amino pyrazole are dissolved in 36.6 parts of concentrated sulphuric acid. This solution is cooled to between 0°C. and 5°C. and a solution of 1.32 parts of sodium nitrite dissolved in 27.5 parts of concentrated sulphuric acid is added. The mixture is stirred for half an hour, then the sulphuric acid solution of the diazo derivative thus obtained is added gradually to a solution of 3.15 parts of N,N-diethyl-metatoluidine in 60 parts of water and 1.8 parts of sulphuric acid. The mixture is taken progressively to pH 4 so as to finish the coupling and the precipitated dyestuff is filtered off, washed with water and dried.

3 parts of the preceding dyestuff are introduced into 6 parts of methyl sulphate. The mixture is heated at 80°C. until a sample is completely soluble in water, and is then allowed to return to the ambient temperature. 10 parts of water are added and it is stirred for half an hour at 95°C. The dyestuff is precipitated by the addition of sodium chloride and zinc chloride, and is filtered off and dried.

The 1-phenyl-2,3-dimethyl-4-chloro-5-(4-diethylamino-2-methyl-phenylazo)-pyrazolium chlorozincate obtained is very soluble in water. It dyes fibres based on polymers or copolymers of acrylonitrile a bluish-red shade, which is bright and remarkably fast, especially to light.

The following Table summarises analogous Examples to the above, using the same diazo derivative but different coupling compounds.

| Example | Coupling compound | Shade |
|---|---|---|
| 2 | N,N-diethylaniline | red |
| 3 | N-ethyl-N-cyanethyl-metatoluidine | red |
| 4 | N-ethyl-N-succinimidoethyl-metatoluidine | Bluish red |

EXAMPLE 5

On replacing in Example 1 the 1-phenyl-3-methyl-4-chloro-5-amino-pyrazole by the equivalent amount of 3-phenyl-4-chloro-5-amino-pyrazole one obtained 1,2-dimethyl-3-phenyl-4-chloro-5 (4-diethylamino-2-methyl-phenylazo)-pyrazolium chlorozincate which dyes fibres based on polymers or copolymers of acrylonitrile a bright red shade with similar properties. The following Table summarises analogous Examples using the diazo derivative of the 3-phenyl-4-chloro-5-amino-pyrazole but different coupling compounds.

| Example | Coupling compound | Shade |
|---|---|---|
| 6 | N,N-diethylaniline | red |
| 7 | N-ethyl-N-cyanethyl-metatoluidine | scarlet |
| 8 | N,N-diethyl-N'-acetyl-metaphenylene-diamine | scarlet |
| 9 | N-ethyl-N-succinimidoethyl-metatoluidine | red |
| 10 | N,N-diethyl-meta-anisidine | scarlet |

The 3-phenyl-5-amino-4-chloro-pyrazole, not yet described in the literature, was prepared from 3-phenyl-5-amino-pyrazole as described below.

24 parts of acetic anhydride are gradually added to 35 parts of 3-phenyl-5-amino-pyrazole in solution in 70 parts of acetic acid. The 3-phenyl-5-acetylamino-pyrazole is precipitated by dilution with an ice-water mixture, and is filtered off and dried. M.p. 236°C. 48 parts of 3-phenyl-5-acetylamino-pyrazole in solution in dimethylformamide are treated with 21 parts of chlorine, and the product is run into water to precipitate 3-phenyl-4-chloro-5-acetylamino-pryazole. The base is liberated by hydrolysis in a 6N hydrochloric acid solution at the boil. The 3-phenyl-5-amino-4-chloro-pyrazole is a white solid melting at 110°–111°C.

Analysis $C_9H_8N_3Cl$. Calculated: C,55.82; H,4.16; N,21.70; Cl,18.31. Found %: C,55.65; H,4.17; N,21.96; Cl,18.30.

EXAMPLE 11

2.4 parts of 4-chloro-5-amino-pyrazole are dissolved in 50 parts of water and 7 parts of concentrated hydrochloric acid. This solution is cooled to between 0°C. and 5°C. then 1.5 parts of sodium nitrite dissolved in 10 parts of water are added and the mixture is stirred for half an hour. The solution of the diazo derivative thus obtained is gradually added to a solution of 3.4 parts of N,N-diethyl-metatoluidine in 60 parts of water and 1.5 parts of hydrochloric acid. The mixture is brought progressively to pH 4 so as to finish the coupling. The precipitated dyestuff is filtered off, washed with water and dried.

3 parts of the above dyestuff are introduced into 8 parts of methyl sulphate, and the mixture is heated at 80°C. until a sample is completely soluble in water. It is then allowed to return to the ambient temperature.

10 parts of water are added and it is stirred for half an hour at 95°C. The dyestuff is precipitated by the addition of sodium chloride and zinc chloride, filtered off and dried.

The 1,2-dimethyl-4-chloro-5-(4-diethylamino-2-methyl-phenylazo)-pyrazolium chlorozincate thus obtained is very soluble in water. It dyes fibres based on polymers or copolymers of acrylonitrile a bluish-red shade, which is bright and remarkably fast, especially to light.

The following Table summarises analogous Examples to the above in which the same diazo derivative is used with different coupling compounds.

| Example | Coupling compound | Shade |
|---|---|---|
| 12 | N-ethyl-N-cyanethyl-metatoluidine | scarlet |
| 13 | N,N-diethyl-meta-anisidine | red |
| 14 | N-ethyl-N-succinimidoethyl-metatoluidine | red |

What I claim is:
1. Dyestuff of the formula:

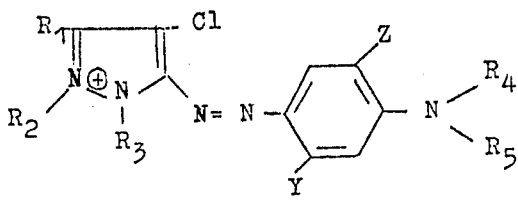 

in which $R_1$ is unsubstituted phenyl or phenyl substituted by one or two chlorine, nitro, methoxy or ethoxy, $R_2$ is methyl or ethyl, $R_3$ is methyl or ethyl, Y is hydrogen, methyl, methoxy, ethoxy, benzoylamino or acetylamino, Z is hydrogen, methoxy or ethoxy, $R_4$ is hydrogen or alkyl containing 1 to 5 carbon atoms, $R_5$ is alkyl containing 1 to 5 carbon atoms, cyanethyl or succinimido ethyl, and $X^-$ is a colourless monovalent anion.

2. 1,2-dimethyl-3-phenyl-4-chloro-5-(4-diethylamino-2-methylphenylazo)pyrazolium chloro-zincate.

3. 1,2-dimethyl-3-phenyl-4-chloro-5-(4-diethylamino-phenylazo)-pyrazolium chlorozincate.

4. 1,2-dimethyl-3-phenyl-4-chloro-5-(N-ethyl-N-cyano-ethyl-4-amino-2-methyl-phenylazo)-pyrazolium chlorozincate.

5. 1,2-dimethyl-3-phenyl-4-chloro-5-(N-ethyl-N-succinimidoethyl-4-amino-2-methyl-phenylazo)-pyrazolium chlorozincate.

* * * * *